US012611359B2

(12) United States Patent
Roychoudhury

(10) Patent No.: US 12,611,359 B2
(45) Date of Patent: Apr. 28, 2026

(54) FOOT MASSAGING SHOE

(71) Applicant: Rohon Roychoudhury, Bloomfield Hills, MI (US)

(72) Inventor: Rohon Roychoudhury, Bloomfield Hills, MI (US)

( * ) Notice: Subject to any disclaimer, the term of this patent is extended or adjusted under 35 U.S.C. 154(b) by 117 days.

(21) Appl. No.: 18/892,926

(22) Filed: Sep. 23, 2024

(65) Prior Publication Data

US 2026/0083628 A1 Mar. 26, 2026

(51) Int. Cl.

| | |
|---|---|
| ***A61H 23/00*** | (2006.01) |
| ***A43B 13/14*** | (2006.01) |
| ***A61H 23/02*** | (2006.01) |

(52) U.S. Cl.

CPC ........... *A61H 23/006* (2013.01); *A43B 13/14* (2013.01); *A61H 23/0254* (2013.01); *A61H 2201/164* (2013.01); *A61H 2201/165* (2013.01)

(58) Field of Classification Search

CPC .............. A61H 23/0254; A61H 23/006; A61H 2023/0281; A61H 2201/164; A61H 15/00; A61H 15/0078; A61H 7/007; A61H 7/001–002; A61H 7/004; A61H 23/02; A61H 39/04; A61H 2015/0042–005; A61H 1/006–008; A61H 2201/1676–1678

See application file for complete search history.

(56) References Cited

U.S. PATENT DOCUMENTS

| | | | | |
|---|---|---|---|---|
| 6,210,349 B1 * | 4/2001 | Naruse | ............... | A61H 15/0078 601/126 |
| 10,188,172 B1 | 1/2019 | Wurtz | | |
| 2010/0228168 A1 * | 9/2010 | Xu | ..................... | A61H 15/0078 601/104 |
| 2012/0186101 A1 | 7/2012 | Sanchez | | |

(Continued)

FOREIGN PATENT DOCUMENTS

| | | | |
|---|---|---|---|
| CN | 203058497 U * | 7/2013 | |
| CN | 115192403 A * | 10/2022 | ............. A61H 7/004 |
| CN | 218853099 U | 4/2023 | |

(Continued)

OTHER PUBLICATIONS

PE2E Translation Huang CN_115192403_A_H (Year: 2022).*

(Continued)

*Primary Examiner* — Victoria Murphy
*Assistant Examiner* — Sydney Reyes Russell
(74) *Attorney, Agent, or Firm* — Brett A. Schenck

(57) ABSTRACT

Foot massaging shoe including a push button into the side of the outsole. The shoe contains a cavity in the sole to allow for an ON/OFF switch, servo motor, rechargeable battery, and motor that together form a closed circuit. The shaft of the motor is attached to a pendulum that includes a main rod connected to three lateral rods. Each of the lateral rods has a massage ball formed at its distal ends. The pendulum rotates about the rotary axis of the shaft in a semicircular fashion from 0 to 180 degrees and back when the push button is pressed, and will stop when the push button is (Continued)

pressed again, such that the three balls move up out of the sole surface to brush up into and laterally across the plantar foot surface of the shoe wearer, and then back down into their respective cavities during the semicircular motion.

18 Claims, 4 Drawing Sheets

(56) References Cited

U.S. PATENT DOCUMENTS

2019/0133249 A1* 5/2019 Omoruyi .................. A43B 3/34

FOREIGN PATENT DOCUMENTS

| | | | | | |
|---|---|---|---|---|---|
| KR | 20100082265 | A | | 7/2010 | |
| KR | 201500057831 | A | | 5/2015 | |
| KR | 20220053090 | A | * | 4/2022 | ................ H02J 7/80 |
| WO | WO-9104001 | A1 | * | 4/1991 | ............. A61H 7/004 |

OTHER PUBLICATIONS

EspaceNet Translation Zheng_CN_203058497 (Year: 2013).*
EspaceNet Translation Kim KR_20220053090 (Year: 2022).*
International Search Report for International Application No. PCT/EP2022/050014, dated Mar. 15, 2022.
Written Opinion of the ISA for International Application No. PCT/EP2022/050014, dated Mar. 15, 2022.

* cited by examiner

FOOT MASSAGING SHOE

FIELD OF THE INVENTION

This disclosure generally relates to a foot massaging shoe that provides massage therapy for sore feet and plantar fasciitis, and more specifically to the stretching of the plantar fascia muscle generated by a massage pendulum that rotates about an axis in the shoe sole, out of and back into the sole while wearing the shoe.

BACKGROUND OF THE INVENTION

Prolonged periods of standing and engaging in high-impact activities such as running, jogging, and jumping are the predominant culprits behind foot discomfort and the onset of conditions like plantar fasciitis. Foot discomfort can further be exacerbated in the obese population as carrying excess body weight places additional stress on the feet. The soreness gets worse over time and impairs a person's ability to function, as well as develops a person's urge for a foot massage. Common treatments are orthotic shoe insoles; however, this treatment doesn't fully alleviate the problem as the plantar fascia muscle still remains stationary even with these added insoles during prolonged sitting or standing.

Hence there is a need to effortlessly stretch and thus massage the plantar fascia muscle during periods where the user undergoes excessive sitting, standing, or locomotion while wearing shoes to alleviate foot soreness, which when built up could lead to plantar fasciitis.

Foot massaging devices have been developed to stretch the foot muscles. But none of these muscle stretching devices are built into a wearable shoe, for alleviation of foot fatigue while the user is out in public. These devices are mainly stationary such that the user would have to return home to access the foot massage. But having access to a foot massage while out in public, inside the privacy of the user's own shoes, immediately when the urge for a massage arises, is preferable to having to wait to return home.

Korean Patent Application No. 20150057831A offers a magnetic vibratory insole mechanism to massage the shoe sole inside of a shoe, however it does not have the same force or precision into trigger points on the plantar surface of the foot. U.S. Pat. No. 10,188,172B1 to Jacob Wurtz discloses an insole with nodules of various heights and diameters that presses into the plantar foot surface during cadence, however these nodules are stationary, not providing the same force or precision into trigger points on the plantar surface of the foot. Korean Patent Application No. 20100082265A offers a foot massaging device consisting of rotating balls that contact the plantar foot and move in a circular motion. However, this device is stationary rather than built into a wearable, portable shoe.

It should be noted roughly seventy five percent of individuals have suffered from foot fatigue or foot pain at some point in their lives. Therefore, there is a need for immediate access to a foot massaging stretching mechanism in the convenience and privacy of one's own shoes to be accessed any time when the user is out in public

SUMMARY OF THE INVENTION

In one aspect of the present invention, a foot massaging shoe is provided. The foot massaging shoe includes a sole. The sole includes a cavity and a motor. The motor is received in the cavity of the sole and includes a motor shaft.

The foot massaging shoes further includes a pendulum. The pendulum is received in the cavity. The pendulum includes a main rod and at least a first lateral rod. The first lateral rod is operatively connected to the main rod and extends radially from a longitudinal axis of the main rod. The first lateral rod includes a first massage ball provided at a distal end of the first lateral rod. The main rod is operatively connected to the motor shaft and rotates about a longitudinal axis of the main rod upon energization of the motor such that the first massage ball moves upwardly out of the cavity to massage.

In further aspects of the present invention, a foot massaging shoe apparatus is provided. The shoe includes a servo motor, a servo controller, a rechargeable battery, a wireless charging receiver, and a push-button switch, wired together to form a closed circuit and placed inside their respective cavity portions of the sole of the shoe. The servo shaft of the servo motor is attached to an axial rotary metal main rod with three shorter perpendicular lateral rods coming off the axial rotary rod. A metal massage ball is attached or formed at each of the distal ends of these perpendicular lateral rods.

The servo motor controller is pre-programmed to rotate the servo motor's shaft when the push button switch is pressed. This then rotates the rotary metal main rod attached to the servo shaft, from an angle of 0 degrees to 180 degrees and back to 0 degrees continuously back and forth until the push button is pressed again. As the axial main rod rotates along the axis of the servo shaft, the three perpendicular shorter lateral metal rods with their respective metal massage balls at the end also rotate continuously back and forth from 0 to 180 degrees, moving in the shape of a semicircle.

The key feature of the shoe lies in the upward and sideways pressure created on the plantar foot surface generated by the force of the metal massage balls as the rotary axial main rod rotates from 0 to 180 degrees, back and forth. This combination of upward and sideways pressure on the plantar fascia muscle creates a stretching effect on the muscle, thus increasing the flexibility of the muscle as well as providing relief to the user from the massaging sensation generated.

Another key feature and advantage of the present invention is its ability to be worn as a regular shoe for when the circuit switch is turned off. The person can remain stationary, walk, jog, or run in the shoes while the switch is in the "OFF" position, thus having the three spheres be at an angle of either 0 or 180 degrees, completely submerged inside of the shoe sole in their respective rod cavity portions in the sole. Then, as need be, the person may press the push button to switch on the shoe to activate the servo motor and initiate the massaging process.

Further features and advantages will appear more clearly on a reading of the following detailed description of the preferred embodiments, which is given by way of non-limiting examples only and with reference to the accompanying drawings. The application of this invention applies to foot wears such as casual sneakers, sandals, as well as formal dress shoes.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

It will be readily understood that the electric circuitry components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
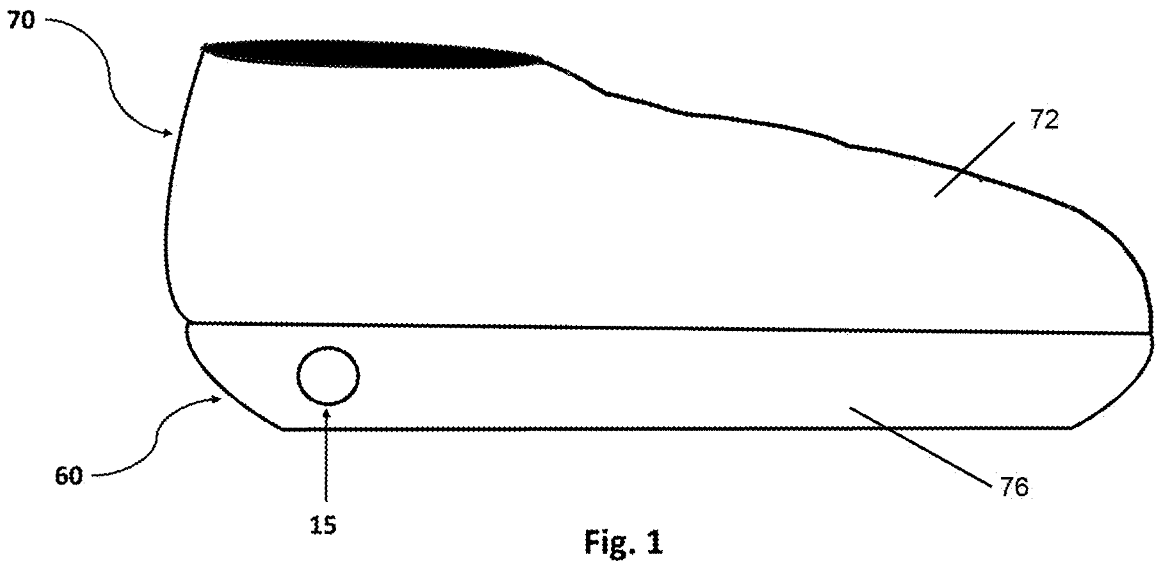
FIG. 1 is a right side view of the foot massaging shoe with the circular ON/OFF push button shown on the sole according to one embodiment of the present invention.

Throughout the present description, the terms “upper”, “lower”, “top”, “bottom”, “left”, “right”, “front”, “forward”, “rear”, and “rearward” shall define directions or orientations with respect to the foot massaging shoe as illustrated in FIG. 1, which shows a right side view of the foot massaging shoe with the circular ON/OFF push button shown on the sole. It will be understood that the spatially relative terms “upper”, “lower”, “top”, “bottom”, “left”, “right”, “front”, “forward”, “rear”, and “rearward” are intended to encompass different orientations of the apparatus in use or operation in addition to the orientation depicted in the figures. For example, if the apparatus in the figures is turned over, elements described as “upper” elements or features would then be “lower”elements or features.

In describing the preferred embodiments of the present invention, as illustrated in FIGS. 1-7, specific terminology is employed for the sake of clarity. The invention, however, is not intended to be limited to the specific terminology so selected, and it is to be understood that each specific elements includes all technical equivalents that operates in a similar manner to accomplish similar functions.

Figure 2:
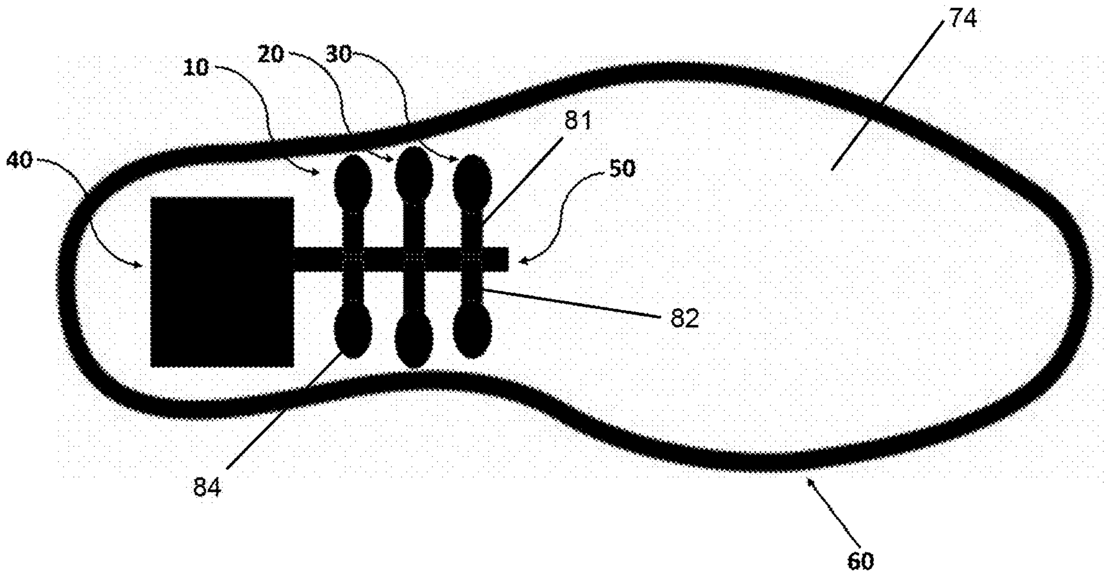
FIG. 2 is a top plan view of the isolated molded shoe sole without any of the electric circuitry components and sole cover.

Referring now to FIGS. 1 and 2, the present invention in one embodiment comprises an electronic foot massaging shoe 70. The shoe 70 includes a sole 60, which is attached to a shoe top 72. The sole 60 includes an insole 74 (FIG. 2) and an outsole 76 (FIG. 1). As seen in FIG. 2, the insole 74 has a cavity 40 formed in the top of the insole 74 with cavity portions that allow for electric circuitry to fit within the cavity 40 entirely such that no part of the circuit rises above the level of a top insole plane 114 (FIG. 5) of the insole 74. The ON/OFF push button switch 45 (FIG. 3) is located at a side of the outsole 76 and has push button 15 (FIG. 1) with a button surface flushed with or at the same lateral surface as the surrounding outsole 76.

Figure 3:
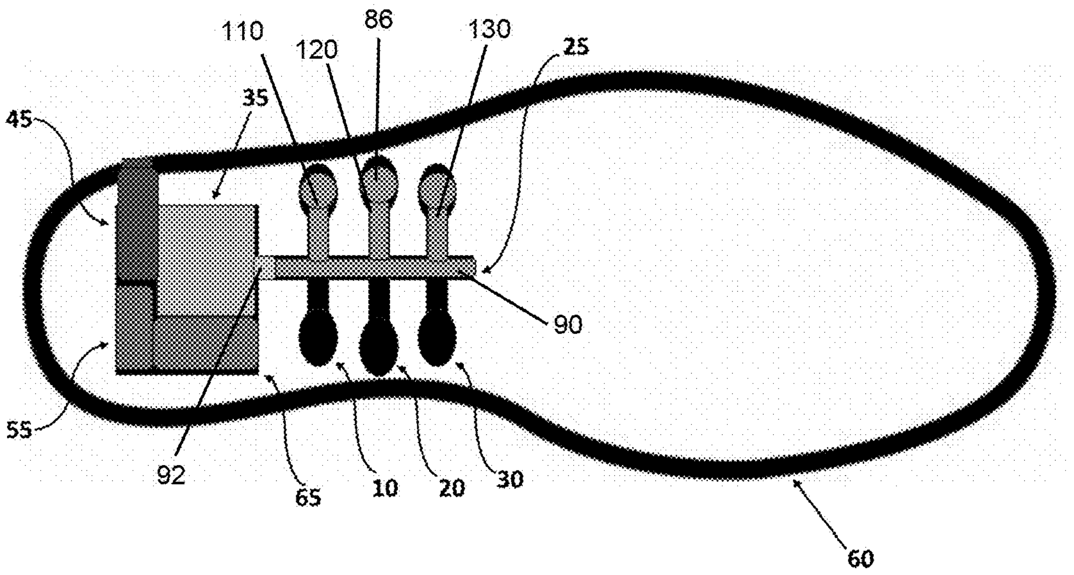
FIG. 3 is a top plan view of the shoe sole with the electronic circuitry components including the ON/OFF push button switch, servo motor, servo motor controller, battery, and metal pendulum attached to the shaft of the servo motor.
Figure 7:
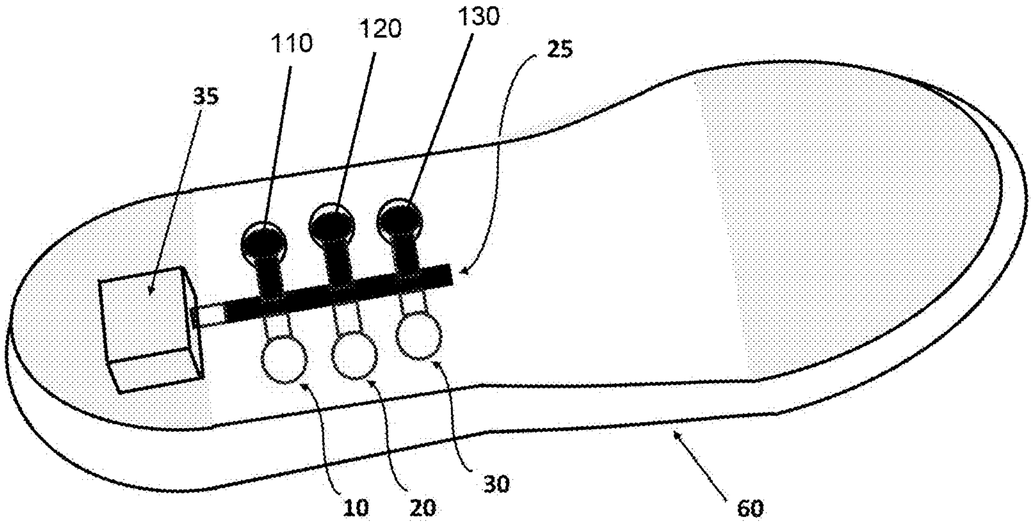
FIG. 7 is a top and left side perspective view of the foot massaging shoe without the sole cover and some other portions removed for illustrated purposes.

As seen in FIG. 2, the cavity 40 is continuous and has cavity portions that define compartments to allow for the compartmentalized fitting of a closed electric circuit along with a metal pendulum 25 (FIG. 3). The cavity 40 includes a main pendulum cavity portion 50 that extends along the longitudinal axis of the shoe 70. The cavity 40 further includes three lateral cavity portions 10, 20, and 30 that communicate and extend laterally from the main pendulum cavity 50. Each lateral cavity portion has first and second symmetrical sections 81, 82. Each symmetrical section 82 has a circular portion 84 to receive a steel massage ball 86 (FIG. 3) of its respective lateral rod 110, 120, 130 (FIG. 3). As seen in FIG. 7, the lateral cavity portions 10, 20, 30 span a length long enough to allow for the lateral rods 110, 120, 130 of the pendulum 25 to fit inside the cavity 40 at either the first or second section whether the pendulum 25 is at a 0-degree or 180-degrees position. The cavity 40 also receives a servo motor 35, the push button switch 45, a servo controller 55 and a battery 65. These components fit within the cavity 40.

FIG. 3 is the top plan view of the shoe sole 60 along with the electric circuitry placed with its components into their respective cavity portions. The ON/OFF push button switch 45, servo controller 55, battery 65, and servo motor 35 are connected by wires in a closed circuit. The battery 65 is electrically coupled to the servo controller 55 and supplies power to it and the servo motor 35 to energize the servo motor 35. The battery 65 may be a rechargeable battery. The servo controller 55 is electrically coupled to the servo motor 35 and controls the operation of the servo motor 35. The metal pendulum 25 includes a main rod 90 that is connected to and coaxial with a servo motor shaft 92. Energization of the servo motor 35 rotates the servo motor shaft 92, which in turn rotates the main rod 90 about its longitudinal axis 94 (FIG. 6). The three lateral rods 110, 120, 130 are connected to the main rod 90 and are oriented perpendicularly from the longitudinal axis 94 (FIG. 6) of the main rod 90. The lateral rods 110, 120, 130 extend radially outward from the main rod 90. Each of the lateral rods has its massage ball 86 formed on or otherwise attached to a distal end 96 (FIG. 5) of the lateral rod. The servo motor shaft 92 and thus pendulum 25 rotate continuously in a semicircular fashion back and forth from zero to one hundred and eighty degrees and then back from one hundred eighty degrees to zero when the push button 15 of the push button switch 45 is pressed and will stop rotating after the massage balls are positioned within the cavity 40 when the push button 15 of the push button switch 45 is pressed again.

Figure 4:
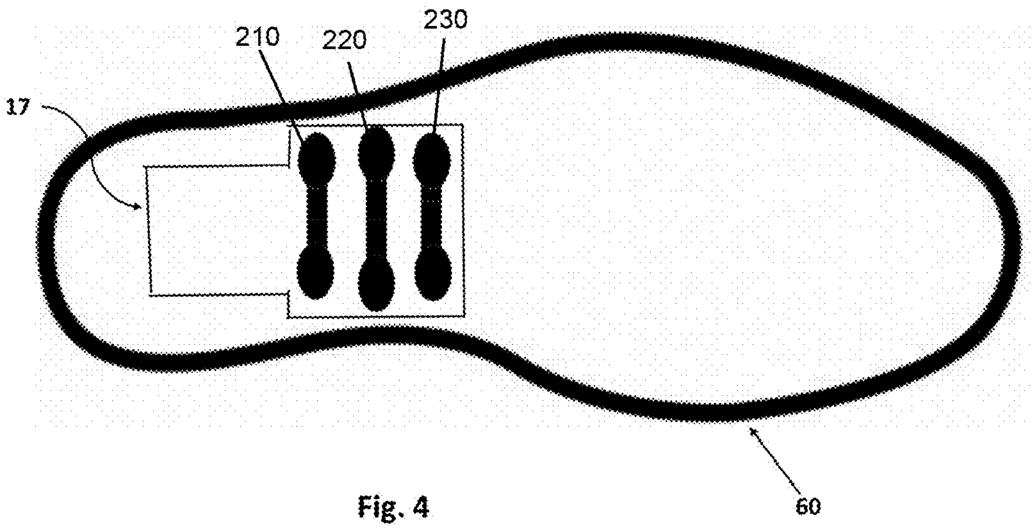
FIG. 4 is a top plan view of FIG. 3 with the addition of a sole cover that is meant to form part of the sole platform in which the foot stands on, as well as to protect the electric circuitry beneath it from the foot.

FIG. 4 is a top plan view of the shoe sole 60 along with a sole cover 17 that fits onto the shoe sole 60 to act as both a barrier and a platform between the electric circuitry and the plantar surface of the foot that fits into the shoe 70. The sole cover 17 has three lateral slots or openings 210, 220, and 230 that are similarly shaped as and aligned with their respective three lateral cavity portions 10, 20, 30 of the cavity 40. The sole cover 17 may be removably attached to the insole 74 and cover the cavity 40 except at the three lateral openings 210, 220, 230. The three lateral openings 210, 220, 230 of the sole cover 17 allow the three metal massage balls 86 of the rotating pendulum 25 to move up through the three lateral openings and back down through the sole cover 17, for the purpose of making contact with the plantar foot surface.

Figure 5:
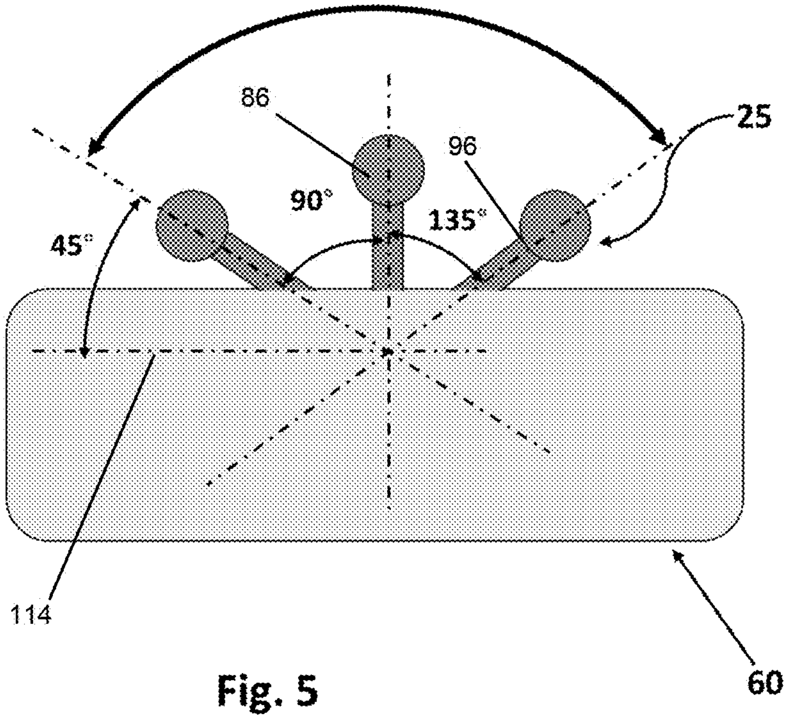
FIG. 5 is a rear view of the shoe depicting three different time shots in motion of the metal pendulum rotating about the axis of the servo shaft, where the pendulum forms a 45-degrees, 90-degrees and 135-degree angle with the plane of the shoe sole.
Figure 6:
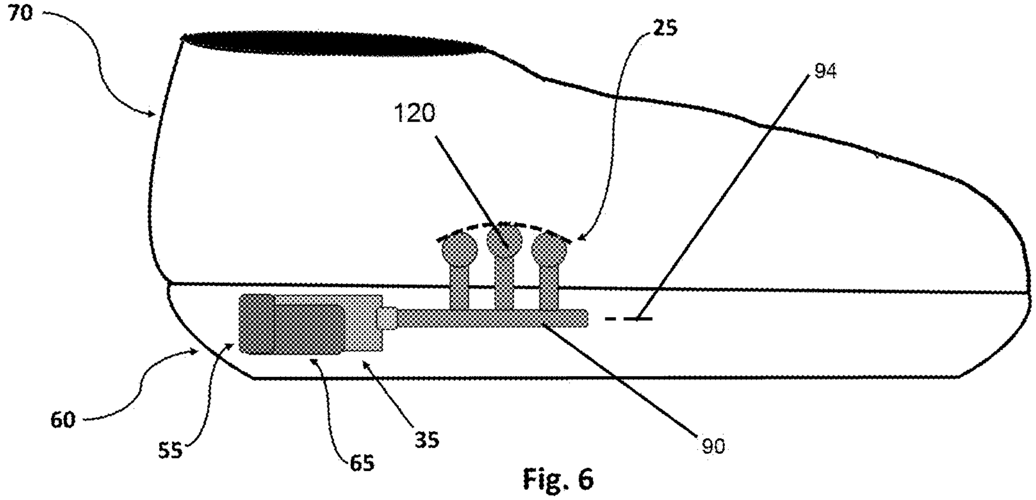
FIG. 6 is a right side view of the foot massaging shoe with portions removed for illustrative purposes showing the pendulums 25 in the vertical 90-degrees position.

FIG. 5 is a back view of the shoe sole 60 with the electric circuit held within the cavity portions of the shoe sole 60 to allow the rotating mechanism of the servo shaft to function. This figure represents three timeframes of the pendulum 25. The lateral rods 110, 120, 130 and the horizontal top insole plane 114 (as viewed in FIG. 5) of the shoe sole 60 form an angle of 45-degrees, 90-degrees, and 135-degrees. At the 90-degree position the massage balls 86 of the lateral rods 110, 120, 130 protrude at the maximal possible distance above the level of the shoe insole plane 114, producing the greatest pressure onto the plantar surface of the user's foot, before then decreasing in pressure on the foot as the pendulum rotates back to the level of becoming parallel with the shoe insole plane 114.

FIG. 6 is a side view of the shoe showing the pendulum 25 in the vertical 90-degrees position. The heights of the three lateral rods 110, 120, 130 of the pendulum 25 form an arc, with the tallest lateral rod 120 in the center, to capture the foot arch profile. The massage balls 86 at the distal end 96 of the lateral rods 110, 120, 130 of the pendulum 25 can be spring loaded to accommodate various foot profiles.

In operation, the entire pendulum 25 fits within the cavity 40 with the lateral rods 110, 120, 130 fitting within their respective first symmetrical sections 81 of the lateral cavity portions 10, 20, 30 in a stationary position as shown in FIG. 7. Upon a user pushing the push button 15, the push button switch 45 closes and connects the battery 65 to the servo controller 55 to supply power to the servo controller 55 and servo motor 35 to energize the servo motor 35 to rotate the pendulum 25 continuously in a semicircular fashion back and forth. In essence, the pendulum 25 may rotate clockwise (viewed from FIG. 5) from zero to one hundred and eighty degrees and then back counterclockwise from one hundred eighty degrees to zero.

Alternatively, the pendulum 25 may have its lateral rods 110, 120, 130 fit within their respective second symmetrical sections 82 of the lateral cavity portions 10, 20, 30 in the stationary position. In this alternative version, upon a user pushing the push button 15, the pendulum 25 may first rotate counterclockwise one hundred and eighty degrees and then back clockwise one hundred and eighty degrees. During either rotation of the pendulum 25, the three metal massage balls 86 of the rotating pendulum move up through the three openings 210, 220, 230 of the sole cover 17 and contact the bottom plantar surface of the foot of a user to massage it, and then they go back down through the openings 210, 220, 230 of sole cover 17 into the their respective circular portions 84 of the cavity 40. When the push button 15 of the push button switch 45 is pressed again, the pendulum 25 is moved to a position within the cavity 40 and stops rotating.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above-described embodiments, method, and examples, but by all embodiments and methods within the scope and spirit of the invention.

What is claimed is:

1. A foot massaging shoe comprising:

a sole, wherein the sole includes a cavity;

a motor, wherein the motor is received in the cavity of the sole, wherein the motor comprises a motor shaft; and a pendulum, wherein the pendulum is received in the cavity, wherein the pendulum includes a main rod, wherein the pendulum includes at least a first lateral rod, wherein the first lateral rod is operatively connected to the main rod and extends radially from a longitudinal axis of the main rod, wherein the first lateral rod includes a first massage ball provided at a distal end of the first lateral rod, wherein the main rod is operatively connected to the motor shaft and rotates about a longitudinal axis of the main rod upon energization of the motor such that the first massage ball moves upwardly out of the cavity to massage;

a sole cover, wherein the sole cover covers the cavity, wherein the sole cover has an opening that exposes the first lateral rod and the first massage ball and enables the first lateral rod and the first massage ball to move upwardly out of the cavity and the sole cover; and wherein the pendulum rotates one hundred and eighty degrees in one of a clockwise and counterclockwise direction and then rotates one hundred and eighty degrees back the other one of the clockwise and counterclockwise direction upon energization of the motor.

2. The foot massaging shoe of claim 1, further comprising second and third lateral rods, wherein the second and third lateral rods are operatively connected to the main rod and extend radially from a longitudinal axis of the main rod, wherein the second lateral rod includes a second massage ball provided at a distal end of the second lateral rod, wherein the third lateral rod includes a third massage ball provided at a distal end of the third lateral rod, wherein the main rod rotates about the longitudinal axis of the main rod upon energization of the motor such that the first, second and third massage balls move upwardly out of the cavity.

3. The foot massaging shoe of claim 1, wherein the longitudinal axis of the main rod is coaxial with a rotary axis of the motor shaft, wherein the motor shaft rotates about the rotary axis upon energization of the motor.

4. The foot massaging shoe of claim 1, further comprising a rechargeable battery, wherein the rechargeable battery is configured to supply power to the motor.

5. The foot massaging shoe of claim 1, further comprising a push button switch, wherein the push button switch includes a push button, wherein the push button is located at a side of the outsole wherein the push button switch is configured to turn on and off the energization of the motor upon depressing the push button.

6. The foot massaging shoe of claim 1, further comprising a servo controller, wherein the motor is a servo motor, wherein the servo controller is electrically coupled to the servo motor to control the operation of the servo motor.

7. A foot massaging shoe comprising: a sole, wherein the sole includes a cavity; a motor, wherein the motor is received in the cavity of the sole, wherein the motor comprises a motor shaft; and a pendulum, wherein the pendulum is received in the cavity, wherein the pendulum includes a main rod, wherein the pendulum includes at least a first lateral rod, wherein the first lateral rod is operatively connected to the main rod and extends radially from a longitudinal axis of the main rod, wherein the first lateral rod includes a first massage ball provided at a distal end of the first lateral rod, wherein the main rod is operatively connected to the motor shaft and rotates about a longitudinal axis of the main rod upon energization of the motor such that the first massage ball moves upwardly out of the cavity to massage, wherein the longitudinal axis of the main rod is coaxial with a rotary axis of the motor shaft, wherein the motor shaft rotates about the rotary axis upon energization of the motor, wherein the pendulum rotates one hundred and eighty degrees in one of a clockwise and counterclockwise direction and then rotates one hundred and eighty degrees back the other one of the clockwise and counterclockwise direction upon energization of the motor.

8. The foot massaging shoe of claim 7, further comprising second and third lateral rods, wherein the second and third lateral rods are operatively connected to the main rod and extend radially from a longitudinal axis of the main rod, wherein the second lateral rod includes a second massage ball provided at a distal end of the second lateral rod, wherein the third lateral rod includes a third massage ball provided at a distal end of the third lateral rod, wherein the main rod rotates about the longitudinal axis of the main rod upon energization of the motor such that the first, second and third massage balls move upwardly out of the cavity.

9. The foot massaging shoe of claim 7, further comprising a rechargeable battery, wherein the rechargeable battery is configured to supply power to the motor.

10. The foot massaging shoe of claim 9, further comprising a push button switch, wherein the push button switch includes a push button, wherein the push button is located at a side of the outsole wherein the push button switch is configured to turn on and off the energization of the motor upon depressing the push button.

11. The foot massaging shoe of claim 10, further comprising a sole cover, wherein the sole cover covers the cavity, wherein the sole cover has an exposed portion that exposes the first lateral rod and first massage ball and enables the first lateral rod and first massage ball to move upwardly out of the cavity and the sole cover.

12. The foot massaging shoe of claim 7, further comprising a servo controller, wherein the motor is a servo motor, wherein the servo controller is electrically coupled to the servo motor to control the operation of the servo motor.

13. A foot massaging shoe comprising: a sole, wherein the sole includes a cavity; a motor, wherein the motor is received in the cavity of the sole, wherein the motor comprises a motor shaft; and a pendulum, wherein the pendulum is received in the cavity, wherein the pendulum includes a main rod, wherein the pendulum includes at least a first lateral rod, wherein the first lateral rod is operatively connected to the main rod and extends radially from a longitudinal axis of the main rod, wherein the first lateral rod includes a first massage ball provided at a distal end of the first lateral rod, wherein the main rod is operatively connected to the motor shaft and rotates about a longitudinal axis of the main rod upon energization of the motor such that the first massage ball moves upwardly out of the cavity to massage, wherein the pendulum rotates one hundred and eighty degrees in one of a clockwise and counterclockwise direction and then rotates one hundred and eighty degrees back the other one of the clockwise and counterclockwise direction upon energization of the motor.

14. The foot massaging shoe of claim 13, further comprising second and third lateral rods, wherein the second and third lateral rods are operatively connected to the main rod and extend radially from a longitudinal axis of the main rod, wherein the second lateral rod includes a second massage ball provided at a distal end of the second lateral rod, wherein the third lateral rod includes a third massage ball provided at a distal end of the third lateral rod, wherein the main rod rotates about the longitudinal axis of the main rod upon energization of the motor such that the first, second and third massage balls move upwardly out of the cavity.

15. The foot massaging shoe of claim 13, wherein the longitudinal axis of the main rod is coaxial with a rotary axis of the motor shaft, wherein the motor shaft rotates about the rotary axis upon energization of the motor.

16. The foot massaging shoe of claim 13, further comprising a rechargeable battery, wherein the rechargeable battery is configured to supply power to the motor.

17. The foot massaging shoe of claim 13, further comprising a push button switch, wherein the push switch includes a push button, wherein the push button is located at a side of the outsole wherein the push button switch is configured to turn on and off the energization of the motor upon depressing the push button.

18. The foot massaging shoe of claim 13, further comprising a servo controller, wherein the motor is a servo motor, wherein the servo controller is electrically coupled to the servo motor to control the operation of the servo motor.

* * * * *